H. VISSERING & P. CARPENTER.
VALVE GEAR FOR STEAM ENGINES.
APPLICATION FILED MAY 23, 1913.
1,103,110.
Patented July 14, 1914.
2 SHEETS—SHEET 1.
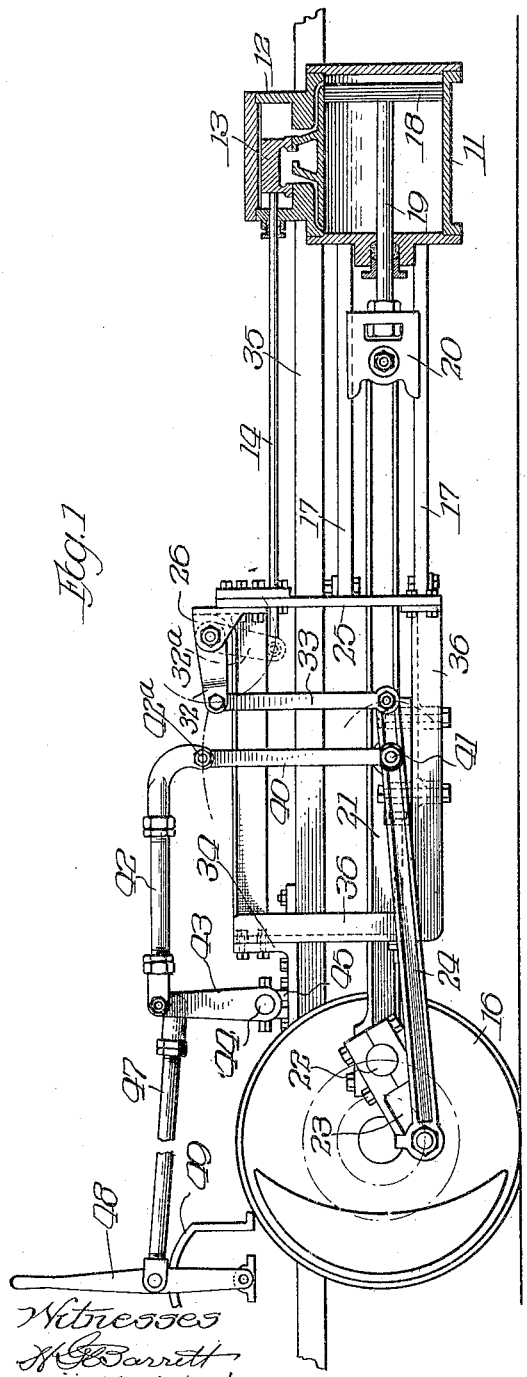
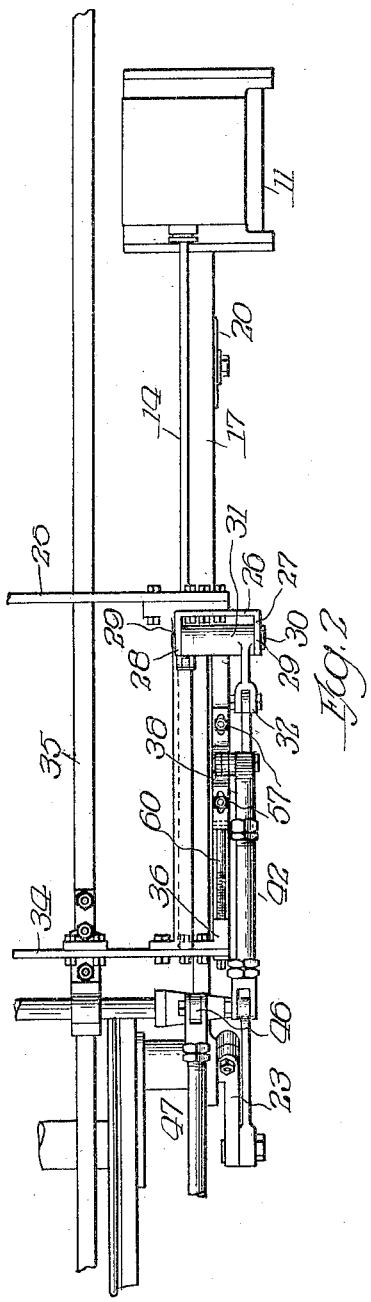

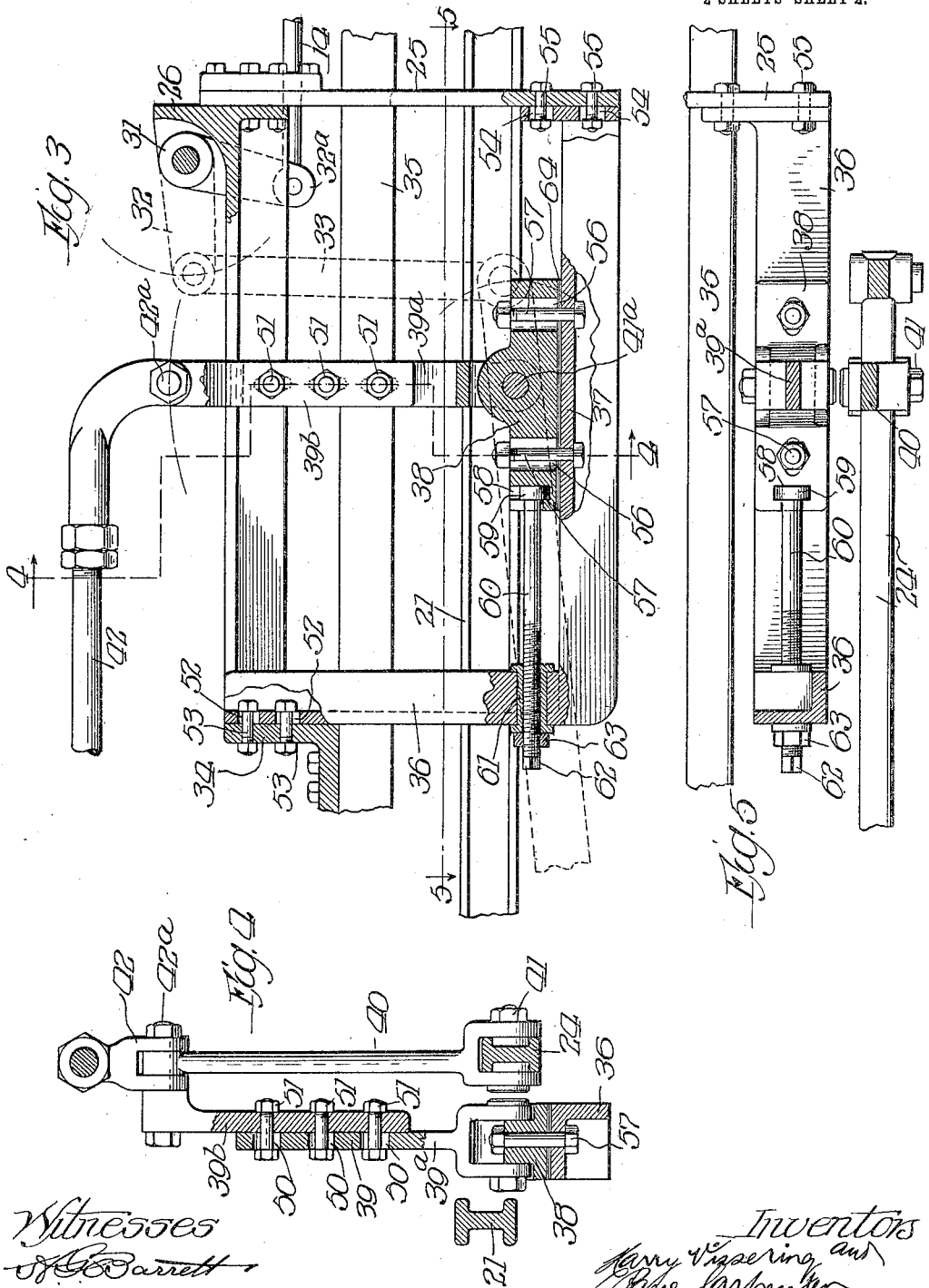

UNITED STATES PATENT OFFICE.

HARRY VISSERING, OF CHICAGO, AND PAUL CARPENTER, OF GLENVIEW, ILLINOIS, ASSIGNORS TO WILLIAM S. MURRIAN, TRUSTEE, OF KNOXVILLE, TENNESSEE.

VALVE-GEAR FOR STEAM-ENGINES.

1,103,110.  Specification of Letters Patent.  Patented July 14, 1914.

Application filed May 23, 1913. Serial No. 769,453.

*To all whom it may concern:*

Be it known that we, HARRY VISSERING and PAUL CARPENTER, citizens of the United States, and residents, respectively, of Chicago and Glenview, in the county of Cook and State of Illinois, have invented certain new and useful Improvements in Valve-Gears for Steam-Engines, of which the following is a specification.

Our present invention relates in general to valve gears, and more particularly to valve gears used for transmitting motion from the crank of the drive wheel of a railway locomotive to the valve which controls the admission of the steam to the cylinder thereof, and has special reference to the provision of an improved construction of valve gear for use in connection with engines having horizontal cylinders.

The principal objects of our present invention are to provide a construction which is simpler and has a less number of friction points than others known to us, and more particularly to a construction wherein the relation of the various parts and pivot points may be varied to the end that not only may a minimum of standardized equipments be required for all classes of service, but that particularly precise compensations may be made for structural variations encountered in practice, and for variations in any given locomotive as the same wears in service, thereby avoiding not only irregularity of the valve action due to lost motion or displacement of parts, but also rendering possible a much higher degree of efficiency in the valve gear, together with such other objects as may hereinafter appear.

In attaining the foregoing objects we have provided a construction one embodiment of which is illustrated in the accompanying drawings, wherein—

Figure 1 is a side elevational view, partly in section, of a portion of a railway locomotive, illustrative of the application of our improvements to one side thereof; Fig. 2 is a plan view of the structure of Fig. 1; Fig. 3 is an enlarged detail view of a portion of the structure of Fig. 1; Fig. 4 is a sectional view taken on the line 4—4 of Fig. 3, looking in the direction indicated by the arrow; and Fig. 5 is a sectional plan view taken on the line 5—5 of Fig. 3.

Referring first to Fig. 1 of the drawing, it will be observed that we have here indicated a well known structure, a cylinder 11, a valve chest 12, a slide valve 13, for controlling admission of steam to the cylinder 11, a valve stem 14 for operating the valve 13, a piston 18 provided with a piston rod 19 coupled to a cross head 20 which is slidably mounted between guides 17—17, said cross head 20 having coupled thereto the connecting rod 21, the opposite end of said rod being coupled to the main crank 22 on the drive wheel 16. The main crank 22 carries an auxiliary crank 23 to which is coupled an auxiliary connecting rod or pitman 24. To the upper portion of the guide yoke 25 is secured a bracket 26 having arms 27, 28, (Fig. 2), the outer ends of said arms being provided with bearings 29, 29, carrying a shaft 30 on which is mounted a bell crank lever 31 or other suitable rocking member having a substantially horizontal bifurcated portion 32 and a substantially vertical portion 32$^a$ which may be connected in any suitable manner to the valve stem 14 to the end that, when the horizontal arm 32 is oscillated vertically by the substantially vertical link 33 having one end coupled to the bifurcated portion of the arm 32, the opposite end of such link 33 being coupled to the forward end of the auxiliary connecting rod or pitman 24, the vertical arm 32$^a$ may be oscillated horizontally and thereby the valve stem 14 reciprocated.

Referring now more particularly to Figs. 3 and 4, it will be noted that in our present improvements we utilize a cross beam or plate 34 extending transversely of the locomotive and suitably secured to the framing 35 thereof. From the cross beam 34 is suspended one end of an L-shaped supporting member 36 the other end thereof being supported by the guide yoke 25, the member 36 being preferably provided with a flanged portion 37 (Fig. 3). The flanged portion 37 serves as a base for a movable supporting member 38 in which is pivoted at 41$^a$ the lower end of an oscillating arm 39 to the upper end of which is pivotally coupled the upper end of a substantially vertical link 40, the opposite end of said link 40 being pivotally coupled to the auxiliary connecting rod 24 by means of a pin 41. The members 39 and 40 are pivotally coupled to the bifurcated end (Fig. 4) of a link 42 by a pin 42$^a$ to a rocker arm 43 which is supported on a shaft 44 mounted in a bearing 45, on the frame member 35, said shaft 44 also carrying an arm 46 to which is coupled a rod 47 which in turn is coupled to a reversing lever 48 working on a sector or quadrant 49.

In the operation of valve gears embodying our improvements, the arm 39 is moved into any desired position by means of the lever 48, and while the arm is so set, the link 40 oscillates on the pin 42$^a$ with each reciprocation of the auxiliary connecting rod 24, the axis of the pin 41 moving in an arc which lies immediately below the axis to which the arc in which the pin 42$^a$ moves is concentric. In Fig. 1 the auxiliary connecting rod 24 is shown on the first quarter, and during each reciprocation thereof the auxiliary connecting rod rocks with the axis of the bolt 41 as a pivot point, the outer end of the rod 24 oscillating back and forth and rocking with said point 41 as a fulcrum, which, inasmuch as it carries the link 33 with it, causes the rocking of the bell crank 31 and the reciprocation of the valve stem 14 as hereinabove described. The gear is reversed in the customary manner by throwing the reversing lever across the center, and the opening of the valve is varied by moving the link 40 toward or away from the perpendicular.

Referring again more particularly to Figs. 3 and 4 it will be observed that for the purpose of varying vertically the axis of the fulcrum 41 relatively to a line which is an extension of the axis of the cylinder 11 and which intersects the axis of the drive wheel 16, we form the link 39 in two parts 39$^a$ and 39$^b$, one thereof, such as the part 39$^a$, being provided with longitudinal slots 50—50, to receive the bolts 51—51, which pass through the other portion 39$^b$; that for the purpose of moving not only the pivot point 41 but also the pivot point 41$^a$ relatively to said line, the L-shaped member 36 is provided with longitudinal slots 52—52, and 54—54, adapted for the reception of bolts 53—53 and 55—55, whereby it is respectively supported by the cross beam 34 and the guide yoke 25; that for the purpose of varying horizontally the position of the pivot point 41$^a$ the supporting member 38 is provided with longitudinal slots 56—56 for the reception of bolts 57—57 by which it is held in fixed position relatively to the horizontal portion of the flange 37 of the member 36, the member 38 being provided at one end with a socket 58 for the reception of the head 59 of a screw 60 engaging with a sleeve 61 in the vertical portion of the member 36, such screw device being provided with a squared portion 62 whereby it may readily be turned and a lock nut 63 whereby it may be held in predetermined position; and that where a very slight variation in the vertical position of the points 41, 41$^a$ relatively to said line is desired, it may be made by loosening the bolts 57 and inserting between the flange 37 and the supporting member 38 any suitable number of thin wedges or plates 64.

From the foregoing description of improved valve gears embodying our invention, it will be observed that not only have we eliminated the friction point commonly present through the employment of a segment and a sliding block adjacent the point 42$^a$, but that we have provided means whereby the following variations may be had, either singly or in combination, viz.: vertical variation of the main fulcrum point relatively to the extended axis of the cylinder, vertical and horizontal variation of the support for the rocker arm, variation of the movement of the controlling valve, and variation of the relation of the cycles of reciprocation thereof relatively to the revolution of the drivers, thus enabling us not only to vary the time of movement of the valve 13 but also the extent thereof, and generally to attain a very precise coördination both as to time and extent, in the movements of the several parts described.

Having thus described our invention and illustrated its use, what we claim as new and desire to secure by Letters Patent is:

1. A valve gear comprising, in combination, a frame, an L-shaped member supported thereby, a pivoted arm carried by said member, an auxiliary connecting rod, means for transmitting motion to the rod, a connection pivoted to the rod and to the arm, and means for connecting the rod to the valve for the operation thereof.

2. A valve gear comprising, in combination, a frame, an L-shaped member supported thereby, an arm support carried by said member, a pivoted arm carried by the support, an auxiliary connecting rod, means for transmitting motion to the rod, a connection pivoted to the rod and to the arm, and means for connecting the rod to the valve for the operation thereof.

3. A valve gear comprising, in combination, a frame, an L-shaped member supported thereby, a pivoted arm carried by said member, an auxiliary connecting rod, means for transmitting motion to the rod, a connection pivoted to the rod and to the arm, and means for connecting the rod to the valve for the operation thereof, said frame and L-shaped member being disposed for relative movement and provided with means for securing them in predetermined position.

4. A valve gear comprising, in combination, a frame, an L-shaped member supported thereby, a pivoted arm carried by said member, an auxiliary connecting rod, means for transmitting motion to the rod, a connection pivoted to the rod and to the arm, and means for connecting the rod to the valve for the operation thereof, one of said frame and L-shaped members being provided with an elongated aperture and the other with means engaging therewith whereby they may be secured in predetermined position.

5. A valve gear comprising, in combination, a frame, an L-shaped member supported thereby, a pivoted arm carried by said member, an auxiliary connecting rod, means for transmitting motion to the rod, a connection pivoted to the rod and to the arm, and means for connecting the rod to the valve for the operation thereof, said frame and L-shaped members being provided with means for varying their relation vertically.

6. A valve gear comprising, in combination, a pivoted arm, an auxiliary connecting rod, means for transmitting motion to the rod, a connection pivoted to the rod and to the arm, and means for connecting the rod to the valve for the operation thereof, said pivoted arm being provided with means for varying the length thereof.

7. A valve gear comprising, in combination, a pivotally supported arm, an auxiliary connecting rod, means for transmitting motion to the rod, a connection pivoted to the rod and to the arm, and means for connecting the rod to the valve for the operation thereof, said pivoted arm being provided with means for varying the relation of its pivotal connection to the rod relatively to its pivotal connection to its support.

8. A valve gear comprising, in combination, a pivoted arm, an auxiliary connecting rod, means for transmitting motion to the rod, a connection pivoted to the rod and to the arm, and means for connecting the rod to the valve for the operation thereof, said pivoted arm being formed in a plurality of parts whereby its length may be varied and provided with means for securing said parts in predetermined relation.

9. A valve gear comprising, in combination, a pivoted arm, an auxiliary connecting rod, means for transmitting motion to the rod, a connection pivoted to the rod and to the arm, and means for connecting the rod to the valve for the operation thereof, said pivoted arm being formed in a plurality of parts whereby its length may be varied, one of said parts being provided with an elongated aperture and another thereof with means engaging said aperture, whereby the parts may be held in predetermined relation.

In testimony whereof we have hereunto signed our names in the presence of the two subscribed witnesses.

HARRY VISSERING.
PAUL CARPENTER.

Witnesses:
MARTHA WESTMAN,
GEORGE F. MATSINGER.

Copies of this patent may be obtained for five cents each, by addressing the "Commissioner of Patents, Washington, D. C."